United States Patent
Kim et al.

(10) Patent No.: US 11,973,222 B2
(45) Date of Patent: Apr. 30, 2024

(54) POSITIVE ELECTRODE ACTIVE MATERIAL PRECURSOR FOR LITHIUM SECONDARY BATTERY, AND METHOD OF PREPARING THE SAME

(71) Applicant: LG Chem, Ltd., Seoul (KR)

(72) Inventors: Seong Bae Kim, Daejeon (KR); Yi Rang Lim, Daejeon (KR); Kyoung Wan Park, Daejeon (KR); Hyun Uk Kim, Daejeon (KR); Hong Kyu Park, Daejeon (KR); Chang Jun Moon, Daejeon (KR); Eun Hee Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 758 days.

(21) Appl. No.: 16/763,697

(22) PCT Filed: Dec. 7, 2018

(86) PCT No.: PCT/KR2018/015570
§ 371 (c)(1),
(2) Date: May 13, 2020

(87) PCT Pub. No.: WO2019/112392
PCT Pub. Date: Jun. 13, 2019

(65) Prior Publication Data
US 2020/0373573 A1    Nov. 26, 2020

(30) Foreign Application Priority Data

Dec. 8, 2017  (KR) .......................... 10-2017-0168709
Dec. 7, 2018  (KR) .......................... 10-2018-0157347

(51) Int. Cl.
*H01M 4/525* (2010.01)
*C01G 53/00* (2006.01)
(Continued)

(52) U.S. Cl.
CPC ............ *H01M 4/525* (2013.01); *C01G 53/40* (2013.01); *H01M 4/505* (2013.01);
(Continued)

(58) Field of Classification Search
CPC .............................. H01M 4/525; H01M 4/505
See application file for complete search history.

(56) References Cited

U.S. PATENT DOCUMENTS

2012/0217435 A1   8/2012   Yamamoto et al.
2012/0256337 A1*  10/2012  Yokoyama ............. C01G 53/40
                                                       241/3
(Continued)

FOREIGN PATENT DOCUMENTS

CN    102574700 A    7/2012
CN    102576869 A    7/2012
(Continued)

OTHER PUBLICATIONS

Iwata; JP2017130395A Translation from Espacenet (Year: 2017).*
(Continued)

*Primary Examiner* — Nathanael T Zemui
(74) *Attorney, Agent, or Firm* — Lerner David LLP

(57) ABSTRACT

A positive electrode active material precursor having a uniform particle size distribution and represented by Formula 1, wherein a percentage of fine powder with an average particle diameter ($D_{50}$) of 1 μm or less is generated when the positive electrode active material precursor is rolled at 2.5 kgf/cm² is less than 1%, and an aspect ratio is 0.93 or more, and a method of preparing the positive electrode active material precursor $$[Ni_xCo_yM^1_zM^2_w](OH)_2 \quad \text{[Formula 1]}$$

in Formula 1, $0.5 \leq x < 1$, $0 < y \leq 0.5$, $0 < z \leq 0.5$, and $0 \leq w \leq 0.1$, $M^1$ includes at least one selected from the group consisting of Mn and Al, and (Continued)

$M^2$ includes at least one selected from the group consisting of Zr, B, W, Mo, Cr, Nb, Mg, Hf, Ta, La, Ti, Sr, Ba, Ce, F, P, S, and Y. A method of preparing the positive electrode active material precursor is also provided.

6 Claims, 8 Drawing Sheets

(51) Int. Cl.
*H01M 4/02* (2006.01)
*H01M 4/505* (2010.01)
*H01M 10/0525* (2010.01)

(52) U.S. Cl.
CPC ..... *H01M 10/0525* (2013.01); *C01P 2006/11* (2013.01); *C01P 2006/12* (2013.01); *C01P 2006/40* (2013.01); *H01M 2004/028* (2013.01); *H01M 2220/20* (2013.01)

(56) References Cited

U.S. PATENT DOCUMENTS

| | | |
|---|---|---|
| 2013/0045421 A1 | 2/2013 | Kobino et al. |
| 2013/0202966 A1 | 8/2013 | Yu et al. |
| 2014/0087263 A1 | 3/2014 | Matsumoto et al. |
| 2016/0006029 A1 | 1/2016 | Sugaya et al. |
| 2016/0133922 A1 | 5/2016 | Uhm et al. |
| 2017/0155144 A1* | 6/2017 | Yamauchi ............ C01G 53/40 |

FOREIGN PATENT DOCUMENTS

| | | |
|---|---|---|
| CN | 105122514 A | 12/2015 |
| CN | 105144436 A | 12/2015 |
| JP | H07165428 A | 6/1995 |
| JP | 2017130395 A | 7/2017 |
| KR | 100752703 B1 | 8/2007 |
| KR | 20110083383 A | 7/2011 |
| KR | 20110099935 A | 9/2011 |
| KR | 20120049227 A | 5/2012 |
| KR | 20120091011 A | 8/2012 |
| KR | 20140047044 A | 4/2014 |
| WO | 2012137533 A1 | 10/2012 |

OTHER PUBLICATIONS

JP6599249B2 Translation from Espacenet (Year: 2019).*
Search Report dated Dec. 23, 2021 from Office Action for Chinese Application No. 201880075007.6 dated Jan. 4, 2022. 3 pgs.
International Search Report from Application No. PCT/KR2018/015570 dated Mar. 21, 2019, 2 pages.

* cited by examiner

PRIOR ART

PRIOR ART

POSITIVE ELECTRODE ACTIVE MATERIAL PRECURSOR FOR LITHIUM SECONDARY BATTERY, AND METHOD OF PREPARING THE SAME

CROSS-REFERENCE TO RELATED APPLICATIONS

This application is a national phase entry under 35 U.S.C. § 371 of International Application No. PCT/KR2018/015570, filed Dec. 7, 2018, which claims priority to Korean Patent Application No. 10-2017-0168709, filed Dec. 8, 2017, and Korean Patent Application No. 10-2018-0157347, filed Dec. 7, 2018, the disclosure of which are incorporated herein reference.

TECHNICAL FIELD

The present invention relates to a positive electrode active material precursor for a lithium secondary battery and a method of preparing the positive electrode active material precursor.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

Lithium transition metal oxides have been used as a positive electrode active material of the lithium secondary battery, and, among these oxides, a lithium cobalt oxide of $LiCoO_2$ having a high operating voltage and excellent capacity characteristics has been mainly used. However, since the $LiCoO_2$ has very poor thermal properties due to an unstable crystal structure caused by lithium deintercalation and is expensive, there is a limitation in using a large amount of the $LiCoO_2$ as a power source for applications such as electric vehicles.

Lithium manganese oxides ($LiMnO_2$ or $LiMn_2O_4$), lithium iron phosphate compounds ($LiFePO_4$, etc.), or lithium nickel oxides ($LiNiO_2$, etc.) have been developed as materials for replacing the $LiCoO_2$. Among these materials, research and development of the lithium nickel oxides, in which a large capacity battery may be easily achieved due to a high reversible capacity of about 200 mAh/g, have been more actively conducted. However, the $LiNiO_2$ has limitations in that the $LiNiO_2$ has poorer thermal stability than the $LiCoO_2$ and, when an internal short circuit occurs in a charged state due to an external pressure, the positive electrode active material itself is decomposed to cause rupture and ignition of the battery.

Accordingly, as a method to improve low thermal stability while maintaining the excellent reversible capacity of the $LiNiO_2$, $LiNi_{1-\alpha}Co_\alpha O_2$ ($\alpha$=0.1 to 0.3), in which a portion of nickel is substituted with cobalt, or a nickel cobalt manganese-based lithium composite metal oxide (hereinafter, simply referred to as "NCM-based lithium oxide"), in which a portion of nickel is substituted with manganese (Mn) and cobalt (Co), has been developed. Also, in order to address safety issues due to elution of metallic elements while having excellent output characteristics, a lithium transition metal oxide having a concentration gradient of a metal composition has also been proposed.

Typically, a method of preparing the positive electrode active material may include a method of preparing a positive electrode active material by preparing a positive electrode active material precursor using a continuous stirred tank reactor (CSTR) and then sintering the positive electrode active material precursor with a lithium raw material and a method of preparing a positive electrode active material by preparing a positive electrode active material precursor using a batch-type reactor and then sintering the positive electrode active material precursor with a lithium raw material. The continuous stirred tank reactor (CSTR) discharges a precursor composed of particles simultaneously while raw materials are added and co-precipitated, and, with respect to the batch-type reactor, raw materials are added according to a volume of the reactor and reacted for a predetermined time, and a precursor is discharged after the completion of the reaction.

In general, with respect to the positive electrode active material precursor prepared by using the continuous stirred tank reactor (CSTR), since the precursor is discharged simultaneously while the raw materials are added and co-precipitated, productivity of the positive electrode active material precursor may be improved, but has limitations in that, since raw material input and product discharge are simultaneously and continuously performed, there may be deviations in retention time and reaction time of the positive electrode active material precursors formed in the reactor, and diameter and particle size distribution of the resulting positive electrode active material precursor particles may be non-uniform.

Also, the positive electrode active material precursor prepared by using the batch-type reactor may have uniform particle diameter and size, but has a limitation in that its productivity is reduced in comparison to that of positive electrode active material precursor prepared by using the CSTR.

DISCLOSURE OF THE INVENTION

Technical Problem

An aspect of the present invention provides a positive electrode active material precursor having excellent particle strength as well as uniform particle diameter, particle shape, and particle size distribution.

Another aspect of the present invention provides a method of preparing a positive electrode active material precursor which may not only provide the positive electrode active material precursor, but may also increase productivity.

Technical Solution

According to an aspect of the present invention, there is provided a positive electrode active material precursor represented by Formula 1, wherein a percentage of fine powder with an average particle diameter ($D_{50}$) of 1 μm or less generated when the positive electrode active material precursor is rolled at 2.5 kgf/cm² is less than 1%, and an aspect ratio is 0.93 or more.

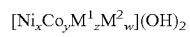  [Formula 1]

In Formula 1, $0.5 \leq x < 1$, $0 < y \leq 0.5$, $0 < z \leq 0.5$, and $0 \leq w \leq 0.1$, $M^1$ includes at least one selected from the group consisting of manganese (Mn) and aluminum (Al), and $M^2$ includes at least one selected from the group consisting of zirconium (Zr), boron (B), tungsten (W), molybdenum (Mo), chromium (Cr), niobium (Nb), magnesium (Mg), hafnium (Hf), tantalum (Ta), lanthanum (La), titanium (Ti), strontium (Sr), barium (Ba), cerium (Ce), fluorine (F), phosphorus (P), sulfur (S), and yttrium (Y).

According to another aspect of the present invention, there is provided a method of preparing a positive electrode active material precursor which includes: forming positive electrode active material precursor particles while adding a reaction solution including a transition metal-containing solution, an ammonium ion-containing solution, and a basic aqueous solution to a reactor with a filtration device installed therein; and performing continuous concentration in which the reaction solution is added while continuously discharging a portion of the reaction solution in the reactor out of the reactor using the filtration device when the reactor is full, wherein a concentration of a solid content in the reactor is increased at a constant rate.

Advantageous Effects

According to the present invention, a positive electrode active material precursor may be prepared in which particle size control is easier than a case where a conventional batch-type method is used and its particle size is uniform. Also, a low productivity problem, a disadvantage of the conventional method, may be solved to significantly increase productivity of the positive electrode active material precursor.

MODE FOR CARRYING OUT THE INVENTION

Figure 1:
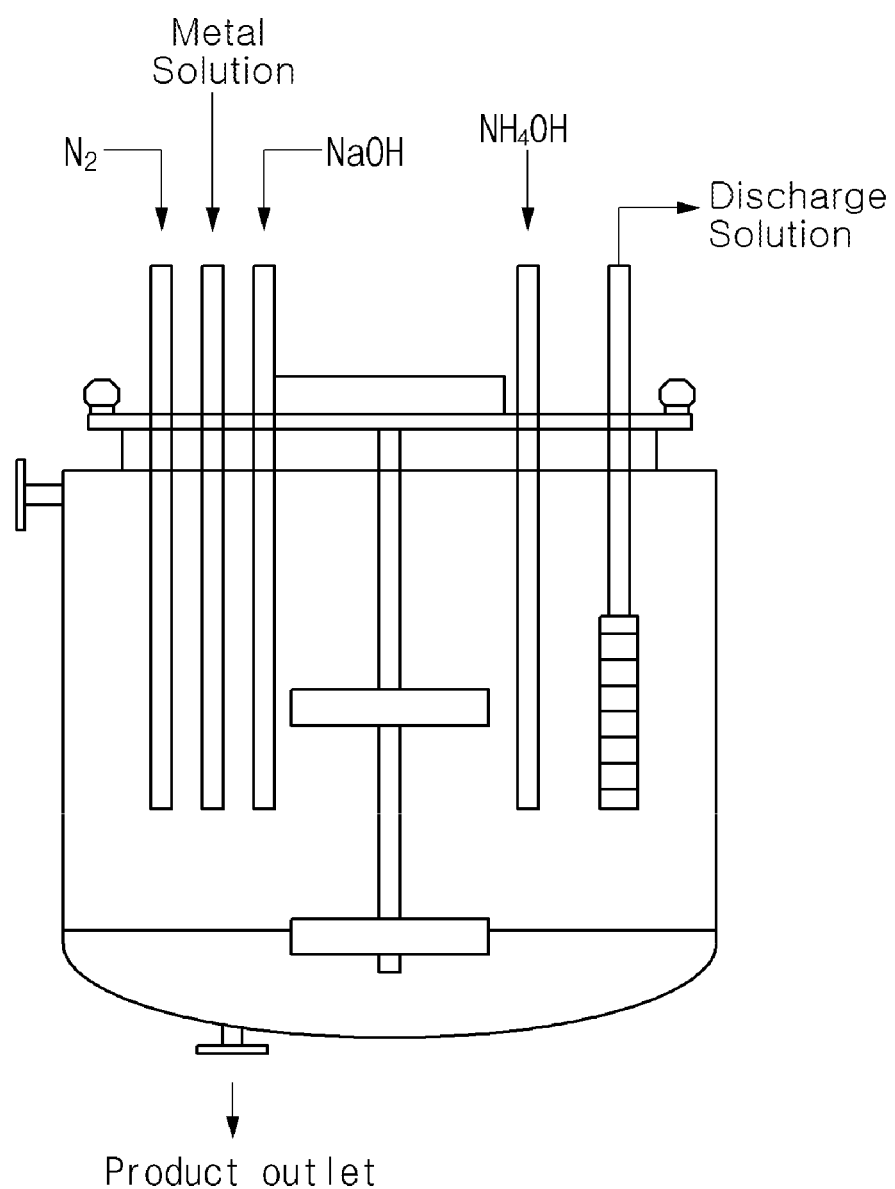
FIG. 1 is a schematic view illustrating a continuous concentration reactor of the present invention.

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The present inventors have found that productivity of a positive electrode active material precursor may be increased by preparing the positive electrode active material precursor using a reactor, but increasing a concentration of a solid content included in the reactor by introducing a reaction solution while continuously discharging a portion of the reaction solution out of the reactor using a filtration device installed in the reactor when the reactor is full, thereby leading to the completion of the present invention.

In the present invention, since the positive electrode active material precursor is prepared by using the reactor with the filtration device installed therein, concentrations of reactants in the reactor are constantly increased and changes in reaction conditions, such as temperature and retention time, are minimized, and thus, a product with excellent quality uniformity may be prepared.

Specifically, a positive electrode active material precursor of the present invention may be represented by Formula 1 below:

$[Ni_xCo_yM^1_zM^2_w](OH)_2$         [Formula 1]

in Formula 1, $0.5 \leq x < 1$, $0 < y \leq 0.5$, $0 < z \leq 0.5$, and $0 \leq w \leq 0.1$, $M^1$ includes at least one selected from the group consisting of manganese (Mn) and aluminum (Al), and $M^2$ includes at least one selected from the group consisting of zirconium (Zr), boron (B), tungsten (W), molybdenum (Mo), chromium (Cr), niobium (Nb), magnesium (Mg), hafnium (Hf), tantalum (Ta), lanthanum (La), titanium (Ti), strontium (Sr), barium (Ba), cerium (Ce), fluorine (F), phosphorus (P), sulfur (S), and yttrium (Y).

The positive electrode active material precursor may further include one having a concentration gradient, and, in this case, a concentration of at least one element of Ni, Co, $M^1$, and $M^2$ may be increased or decreased while the at least one element of Ni, Co, $M^1$, and $M^2$ has a concentration gradient gradually changing from the center of the particle to a surface thereof. For example, in a case in which the metal has a concentration gradient in which the concentration of the metal is gradually changed depending on a position in the positive electrode active material precursor particle, since an abrupt phase boundary region is not present from the center of the particle to the surface thereof, its crystal structure is stabilized and thermal stability is increased.

The positive electrode active material precursor may have an aspect ratio of 0.93 or more, for example, 0.93 to 1. In a case in which the aspect ratio of the positive electrode active material precursor is less than 0.93, a specific surface area of the particle may be increased, particle strength may be reduced, and capacity of a positive electrode active material prepared by using the positive electrode active material precursor may be reduced. The positive electrode active material precursor according to the present invention may have a low Brunauer-Emmett-Teller (BET) specific surface area of 5 m²/g or less, for example, 4 m²/g or less, and may have a high tap density of 2 g/cc or more, for example, 2.1 g/cc to 2.3 g/cc.

In this case, the aspect ratio of the positive electrode active material precursor denotes a ratio of a diameter perpendicular to a major axis (length of a minor axis passing through the center of the particle and perpendicular to the major axis) to a length of the positive electrode active material precursor particle (length of the major axis passing through the center of the particle). In the present invention, scanning electron microscope (SEM) images at a magnification of 2,000 times were taken, 10 particles with the most similar particle diameter to the average particle diameter ($D_{50}$) were selected, and the aspect ratio of the positive electrode active material precursor was calculated by (minor axis)/(major axis).

Also, the tap density denotes apparent density of powder which is obtained by vibrating a container under a predetermined condition when filling the powder, wherein the tap density may be measured by using a typical tap density meter and may specifically be measured by using KYT-5000 by Seishin Enterprise Co., Ltd. With respect to the positive electrode active material precursor in which the tap density satisfies the above range, high capacity characteristics may be obtained when subsequently used in a battery.

The specific surface area of the positive electrode active material precursor is measured by a Brunauer-Emmett-Teller (BET) method, wherein, specifically, the specific surface area may be calculated from a nitrogen gas adsorption amount at a liquid nitrogen temperature (77K) using Belsorp-mini II by Bell Japan Inc.

The positive electrode active material precursor may have an average particle diameter ($D_{50}$) of 2 μm to 30 μm, for example, 3 μm to 20 μm.

Also, the positive electrode active material precursor has a highly uniform particle size distribution and is easily used for a thin battery during the preparation of an electrode. Specifically, the positive electrode active material precursor may have a $(D_{95}-D_5)/D_{50}$ of 0.7 or less, for example, 0.65 or less.

Average particle diameters, $D_5$, $D_{50}$, and $D_{95}$, of the positive electrode active material precursor particles may be respectively defined as particle diameters at 5%, 50%, and 95% in a cumulative particle diameter distribution. In the present invention, the particle diameter distribution of the positive electrode active material precursor particles, for example, may be measured by using a laser diffraction method. Specifically, with respect to the particle distribution of the positive electrode active material, after particles of the positive electrode active material are dispersed in a dispersion medium, the dispersion medium is introduced into a commercial laser diffraction particle size measurement instrument (e.g., Microtrac MT 3000) and irradiated with ultrasonic waves having a frequency of about 28 kHz and an output of 60 W, and the average particle diameters at 5%, 50%, and 95% in a cumulative particle diameter distribution of the measurement instrument may then be calculated.

Furthermore, since the positive electrode active material precursor has high particle strength, an amount of fine powder generated after rolling is very small. Specifically, a percentage of fine powder with an average particle diameter ($D_{50}$) of 1 μm or less generated when the positive electrode active material precursor is rolled at 2.5 kgf/cm² is less than 1%, for example, 0.5% or less. As described above, the positive electrode active material precursor has excellent particle strength, and, as a result, generation of fine powder due to particle breakage caused by the rolling during the preparation of the electrode may be minimized to obtain excellent electrode quality.

In order to prepare the above-described positive electrode active material precursor, the present invention may prepare the positive electrode active material precursor by using a reactor with a filtration device installed therein.

Specifically, provided is a method of preparing a positive electrode active material precursor which includes: forming positive electrode active material precursor particles while adding a reaction solution including a transition metal-containing solution, an ammonium ion-containing solution, and a basic aqueous solution to a reactor with a filtration device installed therein; and performing continuous concentration in which the reaction solution is added while continuously discharging a portion of the reaction solution in the reactor out of the reactor using the filtration device when the reactor is full, wherein a concentration of a solid content in the reactor is increased at a constant rate.

Hereinafter, the method of preparing a positive electrode active material precursor according to the present invention will be described in more detail.

First, nucleus of positive electrode active material precursor particles are formed while a reaction solution including a transition metal-containing solution containing transition metal cations, an ammonium ion-containing solution, and a basic aqueous solution is added to a reactor with a filtration device installed therein.

Before adding the transition metal-containing solution, the ammonium ion-containing solution, and the basic aqueous solution to the reactor, a pH in the reactor may be adjusted by first adding the ammonium ion-containing solution and the basic aqueous solution to a predetermined volume of the reactor.

Transition metals included in the transition metal-containing solution may include nickel, cobalt, or $M^1$ (where $M^1$ is at least one selected from the group consisting of Mn and Al). Specifically, the transition metal-containing solution may include acetic acid salts, nitrates, sulfates, halides, sulfides, hydroxides, oxides, or oxyhydroxides of the above transition metals, and these materials may be used without particular limitation as long as they may be dissolved in water.

For example, the nickel (Ni) may be included as $Ni(OH)_2$, NiO, NiOOH, $NiCO_3$, $2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, a fatty acid nickel salt, or a nickel halide in the transition metal-containing solution, and at least one thereof may be used.

Also, the cobalt (Co) may be included as $Co(OH)_2$, CoOOH, $Co(OCOCH_3)_2 \cdot 4H_2O$, $Co(NO_3)_2 \cdot 6H_2O$, or $CoSO_4 \cdot 7H_2O$ in the transition metal-containing solution, and at least one thereof may be used.

Furthermore, in a case in which $M^1$ is manganese, the manganese (Mn) may be included as a manganese oxide such as $Mn_2O_3$, $MnO_2$, and $Mn_3O_4$; a manganese salt such as $MnCO_3$, $Mn(NO_3)_2$, $MnSO_4$, manganese acetate, manganese dicarboxylate, manganese citrate, and a fatty acid manganese salt; an oxyhydroxide, and manganese chloride in the transition metal-containing solution, and at least one thereof may be used.

Also, the transition metal-containing solution may further include another metallic element ($M^2$) in addition to the nickel, cobalt, and $M^1$. In this case, the metallic element $M^2$ may include at least one selected from the group consisting of Zr, B, W, Mo, Cr, Nb, Mg, Hf, Ta, La, Ti, Sr, Ba, Ce, F, P, S, and Y.

In a case in which the transition metal-containing solution further includes the metallic element ($M^2$), a metallic element ($M^2$)-containing raw material may be further added during the preparation of the transition metal-containing solution.

As the metallic element ($M^2$)-containing raw material, at least one selected from the group consisting of an acetic acid salt, nitrate, sulfate, halide, sulfide, hydroxide, oxide, or oxyhydroxide containing the metallic element ($M^2$) may be used. For example, in a case in which the metallic element ($M^2$) is W, tungsten oxide may be used.

The ammonium ion-containing solution may include at least one selected from the group consisting of $NH_4OH$, $(NH_4)_2SO_4$, $NH_4NO_3$, $NH_4Cl$, $CH_3COONH_4$, and $(NH_4)_2CO_3$. In this case, water or a mixture of water and an organic solvent (specifically, alcohol etc.), which may be uniformly mixed with the water, may be used as a solvent.

The basic aqueous solution may include at least one selected from the group consisting of NaOH, KOH, and $Ca(OH)_2$, and water or a mixture of water and an organic solvent (specifically, alcohol etc.), which may be uniformly mixed with the water, may be used as a solvent.

The forming of the positive electrode active material precursor particles may be performed by including forming particle nucleus by a co-precipitation reaction under a condition in which the pH in the reactor is in a range of 11 to 13, and, after the forming of the nucleus, growing the particles by a co-precipitation reaction by changing the pH in the reactor to a range of 10 to 12.

That is, in the beginning of the reaction, the ammonium ion-containing solution and basic aqueous solution are added to adjust the pH in the reactor to be in a range of 11 to 13, for example, 12 to 13, and, thereafter, particle nucleus may be formed while adding the transition metal-containing solution into the reactor. In this case, since the pH value in the reactor changes as the particle nucleus are formed by the addition of the transition metal-containing solution, the pH value may be controlled to be maintained at 11 to 13 by adding the transition metal-containing solution, the ammonium ion-containing solution, and the basic aqueous solution together. If the pH value satisfies the above range, the particle nucleus may be preferentially formed, and the growth of the particles may hardly occur.

After the formation of the particle nucleus is completed, the pH in the reactor is adjusted to be in a range of 10 to 12, preferably 10 to 11.9, and more preferably 10.5 to 11.7, and the formed particle nucleus may be grown while adding the transition metal-containing solution. In this case, since the pH value changes as the particle nucleus are grown by the addition of the transition metal-containing solution as described above, the pH value may be controlled to be maintained at 10 to 12 by adding the transition metal-containing solution, the ammonium ion-containing solution, and the basic aqueous solution together. In a case in which the pH value satisfies the above range, new particle nucleus may be hardly formed, and the growth of the particles may preferentially occur.

Since the formation of the particle nucleus only occurs in a relatively high pH range and the growth of the particles only occurs in a relatively low pH range by adjusting the pH during the formation of the particle nucleus and the growth of the particles as described above, positive electrode active material precursor particles having a dense structure may be prepared and an effect of improving the particle strength may be achieved. Also, since the particle growth occurs at a constant rate throughout the reaction, particle size and shape of the finally obtained positive electrode active material precursor may be uniform.

For example, the transition metal-containing solution may be added to the reactor such that an addition rate of the transition metal is in a range of 0.15 mol/Lhr to 0.5 mol/Lhr. For example, in a case in which the addition rate of the transition metal is less than 0.15 mol/Lhr, yield of the positive electrode active material precursor may be reduced, and, in a case in which the addition rate of the transition metal is greater than 0.5 mol/Lhr, a particle size distribution of the positive electrode active material precursor may not be uniform.

In addition, since the transition metal-containing solution is added to the reactor such that the addition rate of the transition metal is in a predetermined range (0.15 mol/Lhr to 0.5 mol/Lhr) throughout the nucleation process and the particle growth process, particle growth occurs slowly at a constant rate, and, accordingly, the solid content in the reactor according to the particle growth also increases at a constant rate.

A precursor having a concentration gradient of a transition metal composition in the particle may be prepared by using a first transition metal-containing solution including a nickel cation and a second transition metal-containing solution having a concentration of the transition metal cation, which is different from that of the first transition metal-containing solution, as the transition metal-containing solution.

For example, a first transition metal-containing solution and a second transition metal-containing solution having a concentration of transition metal cation, which is different from that of the first transition metal-containing solution, are mixed through a mixer, and the mixture may then be added to the reactor.

The first and second transition metal-containing solutions, for example, may include a cation of at least one selected from the group consisting of nickel, manganese, and cobalt.

The first and second transition metal-containing solutions may have a different concentration of each transition metal cation, and, for example, the first transition metal-containing solution may be a solution in which a concentration of the nickel cation is higher than that of the second transition metal-containing solution. For example, a molar ratio of the nickel (Ni) salt in the first transition metal-containing solution may be 80% or more based on total transition metal salts, and a molar ratio of the nickel (Ni) salt in the second transition metal-containing solution may be 60% or less based on the total transition metal salts.

Also, the first transition metal-containing solution may be a solution in which a concentration of cation of at least one transition metal of manganese (Mn) and cobalt (Co) is lower than that of the second transition metal-containing solution. For example, a molar ratio of the manganese (Mn) and/or cobalt (Co) salt in the first transition metal-containing solution may be 20% or less based on the total transition metal salts, and a molar ratio of the manganese (Mn) and/or cobalt (Co) salt in the second transition metal-containing solution may be 30% or more based on the total transition metal salts.

A precursor having a concentration gradient of the transition metal composition in the particle may be prepared by adjusting addition rates of the first transition metal-containing solution and the second transition metal-containing solution in which the concentration of the transition metal cation is different.

For example, the concentration gradient may be formed by gradually decreasing the addition rate of the first transition metal-containing solution and gradually and complementarily increasing the addition rate of the second transition metal-containing solution.

Next, continuous concentration is performed in which the reaction solution is added while continuously discharging a portion of the reaction solution in the reactor out of the reactor using the filtration device when the reactor is full after a certain period of time.

The expression "the reactor is full" denotes that a volume of the added reaction solution is in a range of 90% to 100% of a total volume of the reactor.

Specifically, the positive electrode active material precursor particles may be further grown by simultaneously adding the transition metal-containing solution, the ammonium ion-containing solution, and the basic aqueous solution into the reactor while continuously discharging only the reaction-completed solution out of the reactor using the filtration device in the reactor.

The concentration of the solid content in the reactor increases at a constant rate as the positive electrode active material precursor particles grow, and, since growth rate of the positive electrode active material precursor particles is decreased as the concentration of the solid content in the reactor is increased, positive electrode active material precursor particles having a narrow particle size distribution and a dense structure may be formed. In addition, in a case in which the reaction solution is simultaneously added into the reactor while discharging the reaction-completed solution out of the reactor as described above, since the particles may further grow during the same reaction time, productivity of the precursor particles is significantly increased.

A discharge flow of the reaction solution may be the same as an input flow of the reaction solution. For example, in a case in which the input flow of the reaction solution is higher than the discharge flow of the reaction solution, a continuous reaction may not be possible due to an increase in solution level in the reactor, and, in a case in which the input flow of the reaction solution is lower than the discharge flow of the reaction solution, the continuous reaction may not be possible due to a decrease in the solution level in the reactor.

The discharge of the reaction solution is performed by discharging only the reaction solution out of the reactor using the filtration device, wherein the positive electrode active material precursor particles may not be discharged out of the reactor by the filtration device, but only the reaction solution may be selectively and continuously discharged out of the reactor.

In this case, the filtration device may include a metallic filter, and may specifically include at least one selected from the group consisting of stainless steel and carbon steel. The metallic filter may include pores, and a size of the pores may be smaller than a size of the positive electrode active material precursor.

In a case in which the metallic filter is used as described above, since a flow per unit area passing through the filtration device is large, the reaction solution in the reactor may be continuously discharged out of the reactor in a short period of time. Accordingly, the reaction solution may be discharged out of the reactor and, simultaneously, the reaction solution may be added to the reactor.

For example, in a case in which a nonwoven fabric filter medium is used as the filtration device, since a flow of the solution passing through the nonwoven fabric filter medium is very small, the discharge of the reaction solution and the addition of the reaction solution may not be performed at the same time.

Also, the filtration device may be a corrugated filter in a corrugated form, and, in this case, since a specific surface area of the filtration device may be increased, a filtration flow per unit area may be increased 5 times or more in comparison to a case where a solution of the same flow per unit area is added to a simple filtration device having the same size.

In the preparation method of the present invention, the concentration of the solid content in the reactor may be increased at a constant rate, preferably, at a rate of 1.3% per hour to 4.5% per hour, for example, 2% per hour to 4% per hour. Also, in the preparation of the positive electrode active material precursor, it is desirable to terminate the reaction when the concentration of the solid content in the reactor is 20% to 140%, for example, 80% to 120% by continuously performing the reaction for 2 days to 15 days after the initiation of the reaction.

Thus, in a case in which the reaction is terminated when the concentration of the solid content in the reactor is 20% to 140% while the concentration of the solid content in the reactor is increased at a constant rate, the productivity of the precursor particles is increased and, simultaneously, positive electrode active material precursor particles having a narrow particle size distribution and a dense structure may be formed. Specifically, in a case in which positive electrode active material precursor particles are prepared according to the present invention, the yield of the precursor is significantly increased in comparison to when positive electrode active material precursor particles are prepared by a conventional method using the same-sized batch-type reactor without discharge and further addition of the reaction solution.

Also, the reactor of the present invention may also be used in a batch process or a continuous stirring process as well as the continuous concentration process.

For example, a reactor illustrated in FIG. 1 is used, but a concentration process is not performed in which the reaction solution is discharged from the inside of the reactor to a concentration tank installed outside the reactor through a filtration device when the reactor is full, and the reactor may be used in the batch process in which raw materials are added in accordance with the volume of the reactor for a certain period of time and reacted, and a precursor is discharged after the completion of the reaction.

Also, the reactor illustrated in FIG. 1 is used, but the concentration process is not performed in which the reaction solution is discharged from the inside of the reactor to the concentration tank installed outside the reactor through the filtration device when the reactor is full, and the reactor may be used in the continuous stirring process in which raw materials are added and co-precipitated and, simultaneously, a precursor is discharged.

A positive electrode active material may be prepared by mixing the positive electrode active material precursor prepared by the above preparation method with a lithium-containing raw material and sintering the mixture.

The lithium-containing raw material is not particularly limited as long as it is a compound including a lithium source, but, preferably, at least one selected from the group consisting of lithium carbonate ($Li_2CO_3$), lithium hydroxide (LiOH), $LiNO_3$, $CH_3COOLi$, and $Li_2(COO)_2$ may be used.

The positive electrode active material precursor and the lithium-containing raw material may be mixed in a molar ratio of 1:1 to 1:1.15. In a case in which the lithium-containing raw material is mixed in a ratio less than the above range, capacity of the prepared positive electrode active material may be reduced, and, in a case in which the lithium-containing raw material is mixed in a ratio greater than the above range, since particles are sintered during a sintering process, the preparation of the positive electrode active material may be difficult, the capacity may be reduced, and separation of the positive electrode active material particles (inducing positive electrode active material impregnation phenomenon) may occur after the sintering.

The sintering may be performed in a temperature range of 700° C. to 1,000° C. In a case in which the sintering temperature is less than 700° C., since the raw materials may remain in the particles due to an insufficient reaction, high-temperature stability of the battery may be reduced and structural stability may be reduced due to decreases in volume density and crystallinity. In a case in which the sintering temperature is greater than 1,000° C., non-uniform growth of the particles may occur, and, since a size of the particles is excessively increased to reduce an amount of the particles per unit area, volume capacity of the battery may be reduced. In consideration of the particle size control, capacity, and stability of the prepared positive electrode active material particles and a reduction in lithium-containing by-products, the sintering temperature, for example, may be in a range of 700° C. to 950° C.

The sintering may be performed for 5 hours to 35 hours. In a case in which the sintering time is less than 5 hours, since the sintering time is too short, it may be difficult to obtain a high crystalline positive electrode active material, and, in a case in which the sintering time is greater than 35 hours, the size of the particles may be excessively increased and production efficiency may be reduced.

Also, the present invention provides a positive electrode for a lithium secondary battery which includes a positive electrode active material prepared by the above-described method.

Specifically, provided is the positive electrode for a lithium secondary battery which includes a positive electrode collector and a positive electrode active material layer formed on the positive electrode collector, wherein the positive electrode active material layer includes a positive electrode active material according to the present invention.

In this case, since the positive electrode material is the same as described above, detailed descriptions thereof will be omitted, and the remaining configurations will be only described in detail below.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The positive electrode active material layer may selectively include a binder, if necessary, as well as a conductive agent in addition to the above-described positive electrode active material.

In this case, the positive electrode active material may be included in an amount of 80 wt % to 99 wt %, for example, 85 wt % to 98.5 wt % based on a total weight of the positive electrode active material layer. When the positive electrode active material is included in an amount within the above range, excellent capacity characteristics may be obtained.

The conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 0.1 wt % to 15 wt % based on the total weight of the positive electrode active material layer.

The binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 0.1 wt % to 15 wt % based on the total weight of the positive electrode active material layer.

The positive electrode may be prepared according to a typical method of preparing a positive electrode except that the above-described positive electrode active material is used. Specifically, a composition for forming a positive electrode active material layer, which is prepared by dissolving or dispersing the positive electrode active material as well as selectively the binder and the conductive agent in a solvent, is coated on the positive electrode collector, and the positive electrode may then be prepared by drying and rolling the coated positive electrode collector.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

Furthermore, in the present invention, an electrochemical device including the positive electrode may be prepared. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein, since the positive electrode is the same as described above, detailed descriptions thereof will be omitted, and the remaining configurations will be only described in detail below.

Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta(0<\beta<2)$, $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The negative electrode active material may be included in an amount of 80 wt % to 99 wt % based on a total weight of the negative electrode active material layer.

The binder is a component that assists in the binding between the conductive agent, the active material, and the current collector, wherein the binder is typically added in an amount of 0.1 wt % to 10 wt % based on the total weight of the negative electrode active material layer. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated-EPDM, a styrene-butadiene rubber, a fluoro rubber, and various copolymers thereof.

The conductive agent is a component for further improving conductivity of the negative electrode active material, wherein the conductive agent may be added in an amount of 10 wt % or less, for example, 5 wt % or less based on the total weight of the negative electrode active material layer. The conductive agent is not particularly limited as long as it has conductivity without causing adverse chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

For example, the negative electrode active material layer may be prepared by coating a composition for forming a negative electrode, which is prepared by dissolving or dispersing selectively the binder and the conductive agent as well as the negative electrode active material in a solvent, on the negative electrode collector and drying the coated negative electrode collector, or may be prepared by casting the composition for forming a negative electrode on a separate support and then laminating a film separated from the support on the negative electrode collector.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

$NiSO_4$, $CoSO_4$, and $MnSO_4$ were mixed in water in amounts such that a molar ratio of nickel:cobalt:manganese was 6:2:2 to prepare a transition metal-containing solution with a concentration of 2.4 M.

As illustrated in FIG. 1, a container containing the transition metal-containing solution, a 25 wt % NaOH aqueous solution, and a 9 wt % $NH_4OH$ aqueous solution were prepared and connected to a reactor (70 L), respectively.

20 L of deionized water was put in the reactor, the reactor was then purged with nitrogen gas at a rate of 10 L/min to remove dissolved oxygen in the water and create a non-oxidizing atmosphere in the reactor. Thereafter, 40 mL of the 25 wt % NaOH aqueous solution and 870 mL of the 9 wt % $NH_4OH$ aqueous solution were added, and stirring was then performed at a speed of 550 rpm and a temperature of 50° C. to maintain a pH in the reactor at 12.2.

Thereafter, the transition metal-containing solution, the NaOH aqueous solution, and the $NH_4OH$ aqueous solution were respectively added at rates of 8 mol/hr, 16 mol/hr, and 2.4 mol/hr to the reactor and reacted for 240 minutes to form nucleus of nickel cobalt manganese composite metal hydroxide particles at a pH of 12.2.

Subsequently, growth of the nickel cobalt manganese composite metal hydroxide particles was induced by adding the transition metal-containing solution, the NaOH aqueous solution, and the $NH_4OH$ aqueous solution to have a pH of 11.6. Thereafter, the reaction was maintained for 3 hours to grow the nickel cobalt manganese composite metal hydroxide particles, and the reactor (70 L) was full. When the reactor was full, the transition metal-containing solution, the NaOH aqueous solution, and the $NH_4OH$ aqueous solution were continuously added while the reaction-completed solution was continuously discharged out of the reactor through a filtration device located in the reactor and reacted for 73 hours to grow the nickel cobalt manganese composite metal hydroxide particles, and the resulting nickel cobalt manganese composite metal hydroxide particles were separated, washed, and then dried in an oven at 120° C. to prepare a $Ni_{0.6}Co_{0.2}Mn_{0.2}(OH)_2$ precursor (BET specific surface area: 3.1 m$^2$/g, tap density: 2.18 g/cc, and aspect ratio: 0.93).

Example 2

A $Ni_{0.8}Co_{0.1}Mn_{0.1}(OH)_2$ positive electrode active material precursor (BET specific surface area: 3.6 m$^2$/g, tap density: 2.15 g/cc, and aspect ratio: 0.94) was prepared in the same manner as in Example 1 except that $NiSO_4$, $CoSO_4$, and $MnSO_4$ were mixed in water in amounts such that a molar ratio of nickel:cobalt:manganese was 8:1:1.

Comparative Example 1

Figure 2:
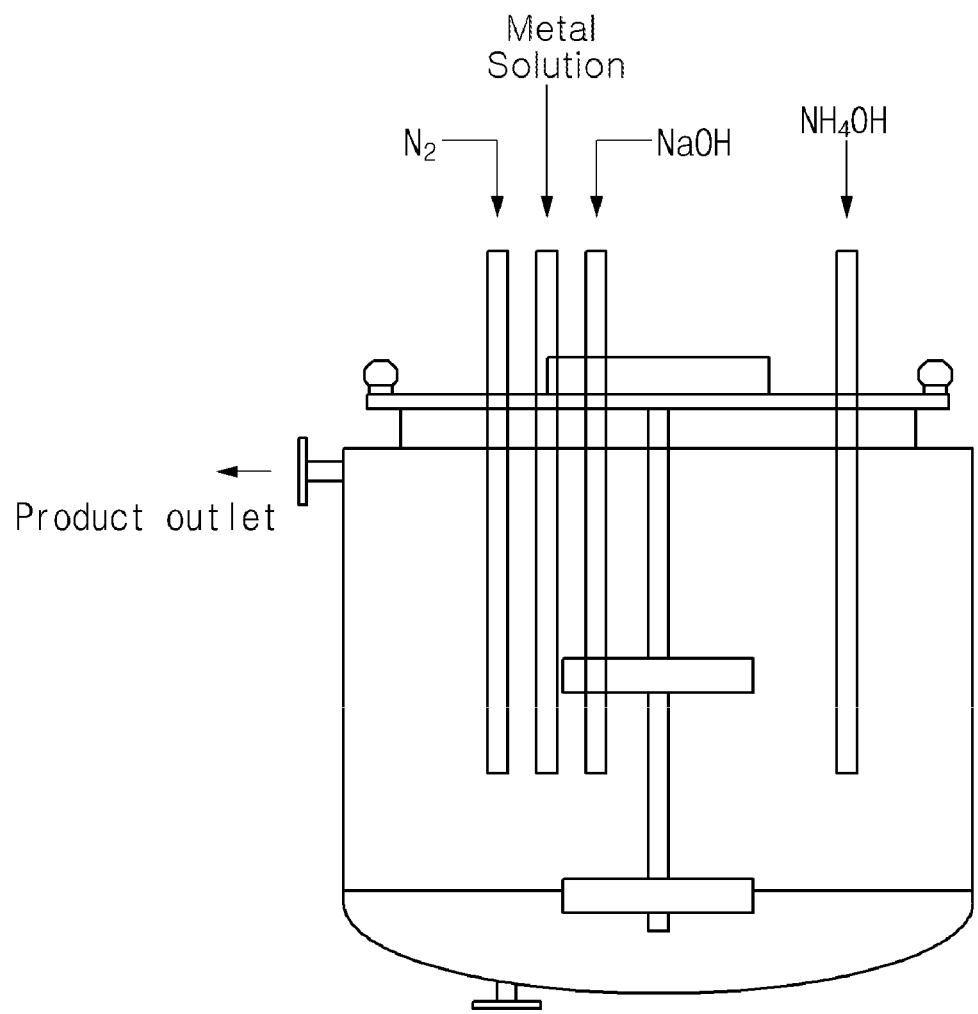
FIG. 2 is a schematic view illustrating a conventional continuous stirred tank reactor (CSTR)

A positive electrode active material precursor was prepared by using a continuous stirred tank reactor (CSTR) of FIG. 2.

NiSO$_4$, CoSO$_4$, and MnSO$_4$ were mixed in water in amounts such that a molar ratio of nickel:cobalt:manganese was 6:2:2 to prepare a transition metal-containing solution with a concentration of 2.4 M. The transition metal-containing solution, a NaOH aqueous solution, and a NH$_4$OH aqueous solution were respectively added at rates of 8 mol/hr, 16 mol/hr, and 2.4 mol/hr to the continuous stirred tank reactor (CSTR) as in FIG. 2. A temperature of the reactor was set at 50° C., and the mixture was stirred at a speed of 400 rpm to precipitate nickel cobalt manganese composite metal hydroxide. The resulting nickel cobalt manganese composite metal hydroxide particles were separated, washed, and then dried in an oven at 120° C. to prepare a Ni$_{0.6}$Co$_{0.2}$Mn$_{0.2}$(OH)$_2$ precursor (BET specific surface area: 7.2 m$^2$/g, tap density: 2.02 g/cc, and aspect ratio: 0.86).

Comparative Example 2

Figure 3:
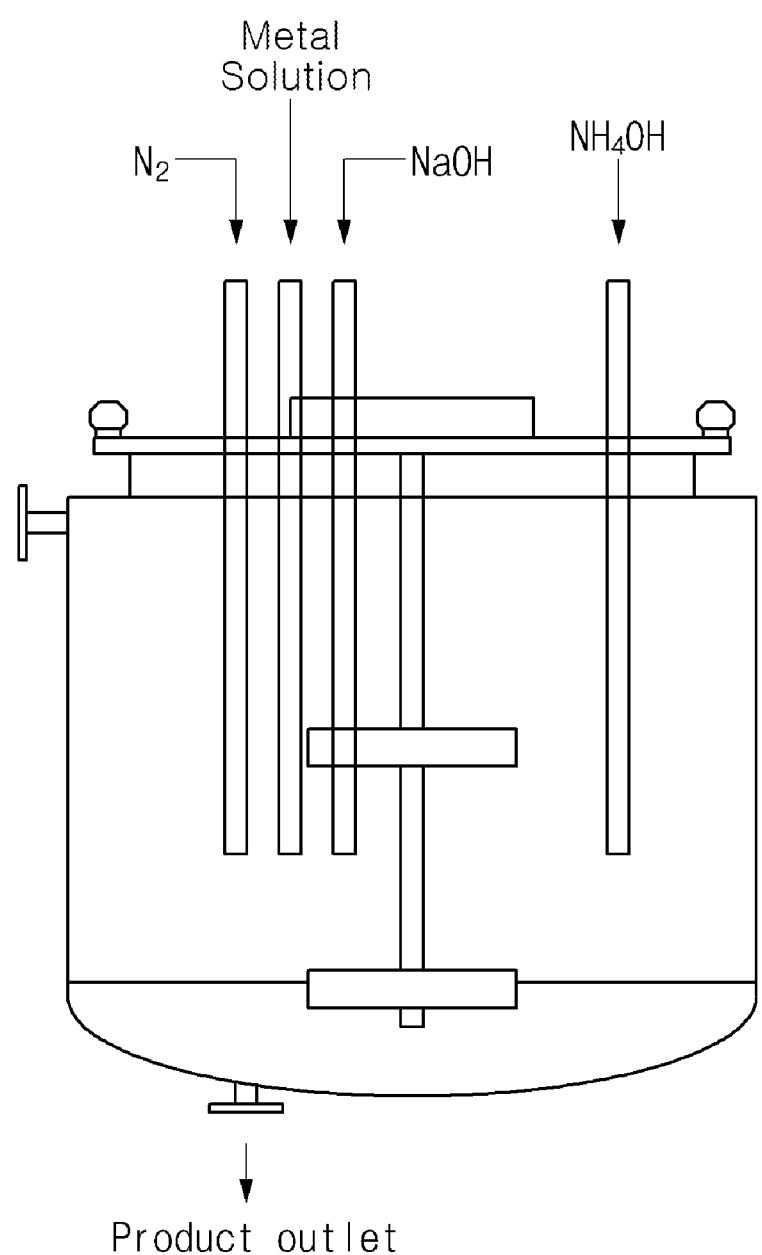
FIG. 3 is a schematic view illustrating a conventional batch-type reactor.

The transition metal-containing solution, the NaOH aqueous solution, and the NH$_4$OH aqueous solution were respectively added at rates of 5.8 mol/hr, 11.6 mol/hr, and 1.74 mol/hr to the reactor of FIG. 3 and reaction was maintained for 12 hours to grow nickel cobalt manganese composite metal hydroxide particles until the reactor (70 L) was full. A Ni$_{0.6}$Co$_{0.2}$Mn$_{0.2}$(OH)$_2$ precursor (BET specific surface area: 8.5 m$^2$/g, tap density: 1.84 g/cc, and aspect ratio: 0.89) was prepared in the same manner as in Example 1 except that the reaction was terminated when the reactor was full.

Comparative Example 3

Nucleus of nickel cobalt manganese composite metal hydroxide particles were formed in the same manner as in Example 1, and, subsequently, while pH was maintained at 11.6, the transition metal-containing solution, the NaOH aqueous solution, and the NH$_4$OH aqueous solution were respectively added at rates of 8 mol/hr, 16 mol/hr, and 2.4 mol/hr to induce growth of the nickel cobalt manganese composite metal hydroxide particles. Thereafter, the reaction was maintained for 4 hours to grow the nickel cobalt manganese composite metal hydroxide particles. When the reactor was full, the addition rates of the transition metal-containing solution, the NaOH aqueous solution, and the NH$_4$OH aqueous solution were maintained, but the reaction solution was transferred to a concentration tank and concentrated for 10 hours using a filter cloth included in the concentration tank. Subsequently, the reaction was maintained for 73 hours while repeating a process of recycling a solid content contained in a concentrated slurry to the reactor at a rate of 50%/hr, and the resulting nickel cobalt manganese composite metal hydroxide particles were separated, washed, and then dried in an oven at 120° C. to prepare a Ni$_{0.6}$Co$_{0.2}$Mn$_{0.2}$(OH)$_2$ precursor (BET specific surface area: 6.3 m$^2$/g, tap density: 2.06 g/cc, and aspect ratio: 0.91).

Comparative Example 4

A transition metal-containing solution, a NaOH aqueous solution, and a NH$_4$OH aqueous solution were respectively added at rates of 4.8 mol/hr, 9.6 mol/hr, and 1.44 mol/hr to grow nickel cobalt manganese composite metal hydroxide particles. When a reactor was full, the transition metal-containing solution, the NaOH aqueous solution, and the NH$_4$OH aqueous solution were continuously added, while the reaction-completed solution was continuously discharged out of the reactor through a filtration device with a filter cloth attached thereto which was located in the reactor, and reacted for 80 hours to grow the nickel cobalt manganese composite metal hydroxide particles, and the resulting nickel cobalt manganese composite metal hydroxide particles were separated, washed, and then dried in an oven at 120° C. to prepare a Ni$_{0.6}$Co$_{0.2}$Mn$_{0.2}$(OH)$_2$ precursor (BET specific surface area: 1.95 m$^2$/g, tap density: 1.78 g/cc, and aspect ratio: 0.88).

Experimental Example 1: Particle Size Distribution Evaluation

In order to check particle size distributions of the positive electrode active material precursor particles prepared in Examples 1 and 2 and Comparative Example 1, 2, and 4, particle diameters of the positive electrode active material precursors formed in Example 1 and 2 and Comparative Examples 1, 2, and 4 were measured using S-3500 by Microtrac, and the results thereof are presented in Table 1 and FIG. 4 below.

TABLE 1

|  | $D_5$ (μm) | $D_{50}$ (μm) | $D_{95}$ (μm) | $(D_{95} - D_5)/D_{50}$ |
| --- | --- | --- | --- | --- |
| Example 1 | 8.3 | 10.8 | 14.9 | 0.61 |
| Example 2 | 8.2 | 11.0 | 15.6 | 0.67 |
| Comparative Example 1 | 4.7 | 10.5 | 21.1 | 1.56 |
| Comparative Example 2 | 8.2 | 10.6 | 15.8 | 0.72 |
| Comparative Example 4 | 6.2 | 8.3 | 12.0 | 0.70 |

Figure 4:
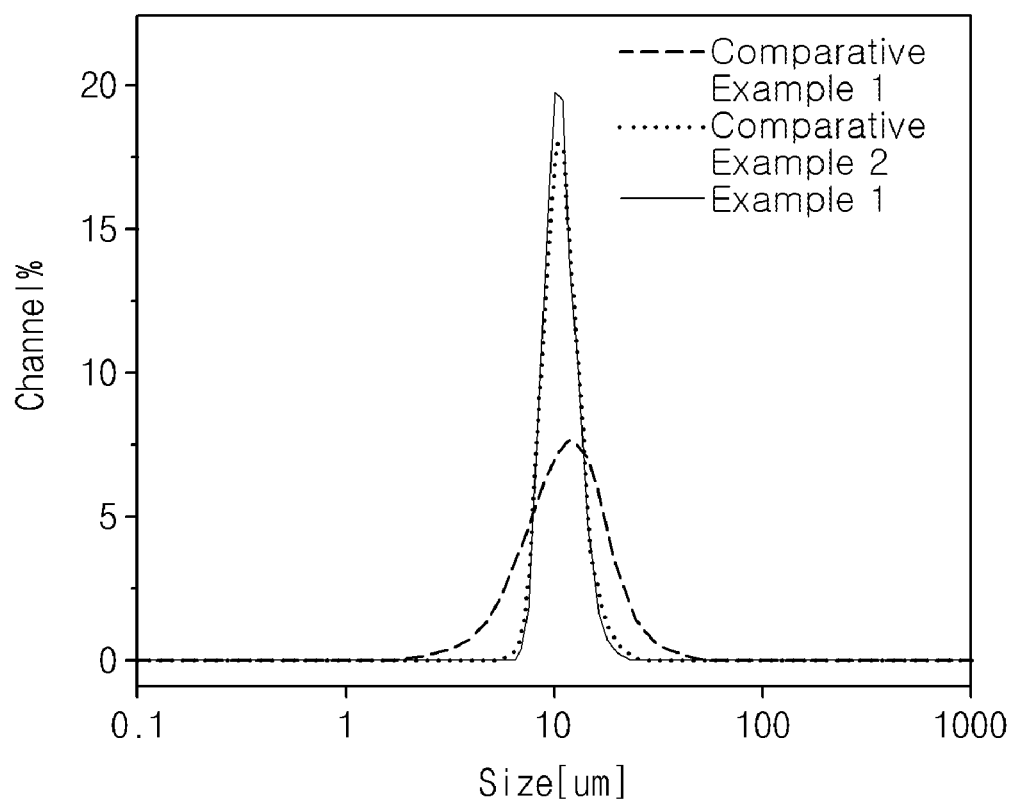
FIG. 4 is a graph illustrating particle size distributions of positive electrode active material precursors respectively prepared in Example 1 and Comparative Examples 1 and 2.

As illustrated in Table 1 and FIG. 4, in a case in which the continuous concentration reaction of Examples 1 and was performed, it may be confirmed that the positive electrode active material precursors having a narrower particle size distribution than Comparative Examples 1, 2, and 4 were prepared. Accordingly, it may be understood that particle diameters of the positive electrode active material precursors prepared in Examples 1 and 2 were more uniform that those of the positive electrode active material precursors prepared in Comparative Examples 1, 2, and 4.

With respect to the precursor prepared in Comparative Example 4, it may be confirmed that the precursor having a smaller average particle diameter than the positive electrode active material precursors prepared in Examples 1 and 2 was formed due to differences in input flow of the reaction solution including the transition metal-containing solution, the NaOH aqueous solution, and the NH$_4$OH aqueous solution, and retention time of the reaction solution depending on a filtration area.

Experimental Example 2: Pellet Density Evaluation

After the positive electrode active material precursor particles prepared in Examples 1 and 2 and Comparative Examples 1, 2, and 4 were respectively compressed at a rolling density of 1.5 kgf/cm$^2$, 2.0 kgf/cm$^2$, 2.5 kgf/cm$^2$, and 3.0 kgf/cm$^2$ to be prepared in the form of pellets, densities of the positive electrode active material precursors were measured using 4350L by Carver Inc. The measurement results are presented in Table 2 and FIG. 5 below.

TABLE 2

| Pressure (kgf/cm²) | Pellet density (g/cc) | | | |
|---|---|---|---|---|
| | Example 1 | Example 2 | Comparative Example 1 | Comparative Example 2 |
| 1.5 | 2.58 | 2.49 | 2.42 | 2.48 |
| 2.0 | 2.68 | 2.66 | 2.53 | 2.56 |
| 2.5 | 2.76 | 2.75 | 2.63 | 2.62 |
| 3.0 | 2.83 | 2.78 | 2.71 | 2.69 |

Figure 5:
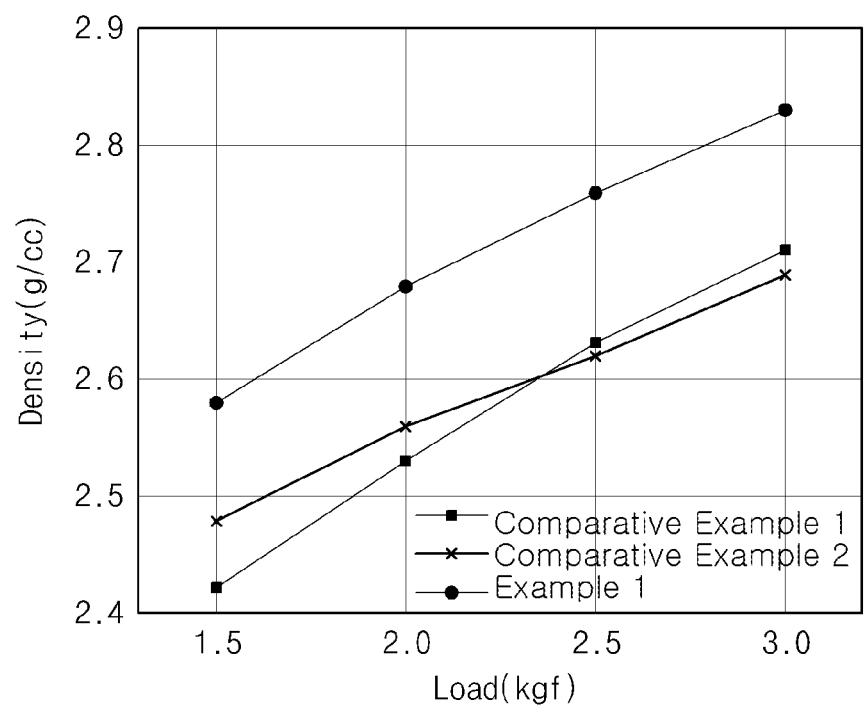
FIG. 5 is a graph illustrating pellet densities of the positive electrode active material precursors respectively prepared in Example 1 and Comparative Examples 1 and 2.

In this regard, FIG. 5 is a graph in which the positive electrode active material precursor particles were compressed at different rolling densities to be prepared in the form of pellets, and a change in density of each pellet was illustrated. As illustrated in FIG. 5, it may be confirmed that the positive electrode active material precursor prepared in Example 1 had higher pellet density than the positive electrode active material precursors prepared in Comparative Examples 1 and 2. With respect to the positive electrode active material precursor prepared in Example 1, since the growth of the particles was slower than those of Comparative Examples 1 and 2, the particles may be densely grown to prepare a high strength precursor.

Experimental Example 3: Evaluation of Amount of Fine Powder Generated

After the positive electrode active material precursors prepared in Examples 1 and 2 and Comparative Examples 1 and 2 were respectively compressed at 2.5 kgf/cm², a particle size distribution was measured to measure a percentage of fine powder with a particle diameter of less than 1 μm generated. The particle size distribution was measured using S-3500 by Microtrac, and the measurement results are presented in FIG. 6.

Figure 6:
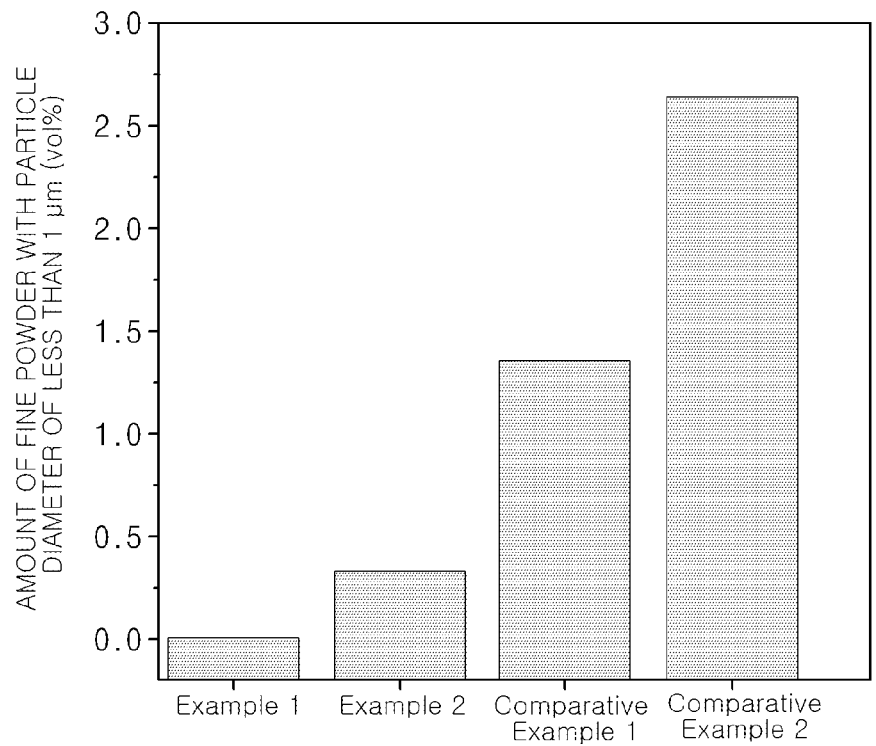
FIG. 6 is a graph illustrating amounts of fine powders with a particle diameter of less than 1 μm which are measured after rolling positive electrode active material precursors respectively prepared in Examples 1 and 2 and Comparative Examples 1 and 2 at 2.5 kgf/cm².

As illustrated in FIG. 6, with respect to the positive electrode active material precursors prepared in Examples 1 and 2, it may be confirmed that percentages of fine powder having a particle diameter of less than 1 μm generated, which were measured after the precursors were compressed at a rolling density of 2.5 kgf/cm² to be prepared in the form of pellets, were respectively less than 1%.

However, with respect to the positive electrode active material precursors prepared in Comparative Examples 1 and 2, it may be confirmed that percentages of fine powder having a particle diameter of less than 1 μm generated were 1.3% and 2.6%, respectively.

Accordingly, with respect to the positive electrode active material precursor particles prepared in Examples 1 and 2, since strengths of the particles were better than those of the positive electrode active material precursor particles prepared in Comparative Examples 1 and 2, it may be confirmed that the percentages of fine powder with a particle diameter of less than 1 μm generated when the positive electrode active material precursor particles prepared in Examples 1 and 2 were compressed were lower.

Experimental Example 4: Evaluation of Changes in Solid Content in Reactor 50 mL of the solution in each of the reactors of Example 1 and Comparative Examples 1 and 3 was extracted at intervals of 10 hours, filtered under reduced pressure, and dried at 120° C., and an amount of the recovered precursor was divided by the amount of the extracted solution (50 mL) to measure changes in solid content in the reactor. The measurement results are presented in FIG. 7.

Figure 7:
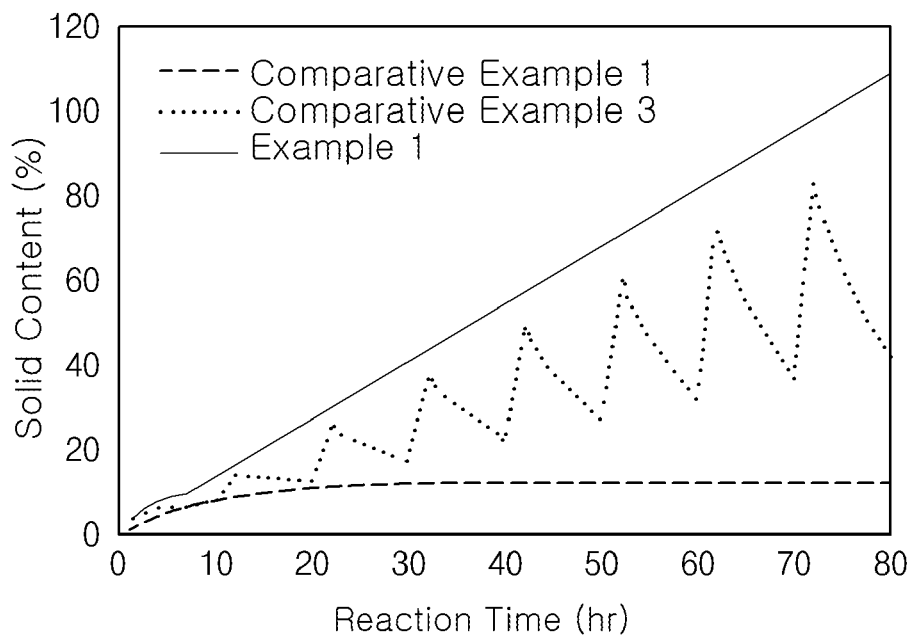
FIG. 7 is a graph illustrating solid contents of positive electrode active material precursors respectively prepared in Example 1, Comparative Example 1, and Comparative Example 3 according to reaction time.

As illustrated in FIG. 7, it may be confirmed that the solid content in the reactor of Example 1 was increased at a constant rate as the reaction time elapsed.

In contrast, in a case in which the positive electrode active material precursor was prepared by using the continuous reactor as in Comparative Example 1, it may be confirmed that the solid content in the reactor was not changed over time.

Also, in a case in which the reaction-completed solution was concentrated in the separate concentration tank and the solid content contained in the concentrated slurry was then recycled to the reactor as in Comparative Example 3, it may be confirmed that a region of change in solid content occurred in comparison to the present invention in which the solid content was increased at a constant rate by continuous reaction in the same reactor.

Experimental Example 5: Particle Characteristics Evaluation

Particle characteristics of the positive electrode active material precursors prepared by Example 1 and Comparative Examples 1 and 3 were confirmed by taking images of the positive electrode active material precursors with a scanning electron microscope.

Figure 8:
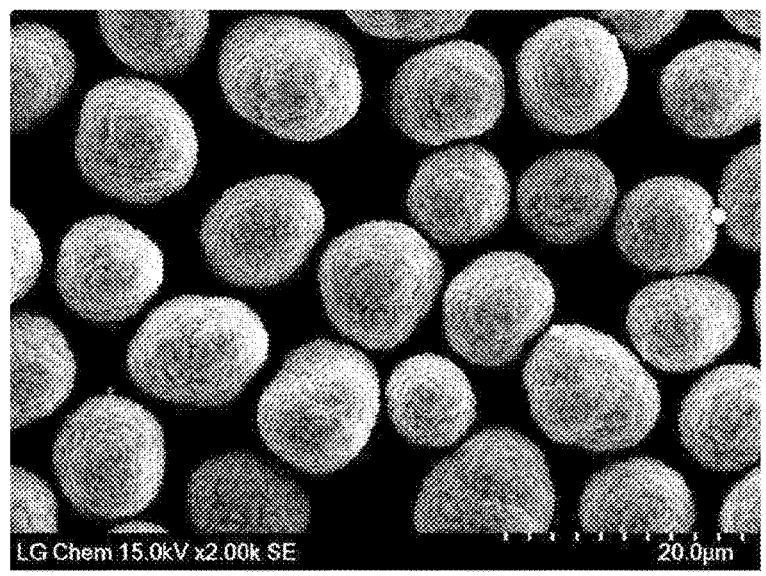
FIGS. 8 through 10 illustrate scanning electron microscope (SEM) images taken from the positive electrode active material precursors respectively prepared in Example 1, Comparative Example 1, and Comparative Example 3.
Figure 9:
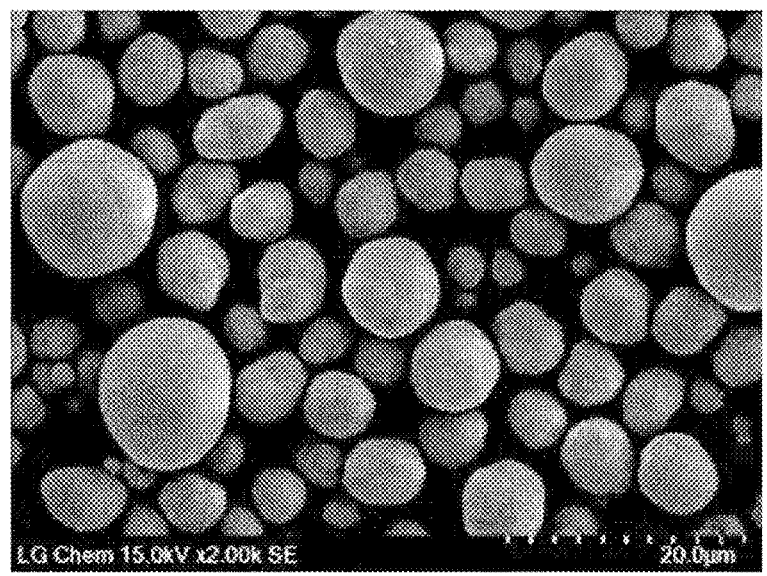
Figure 10:
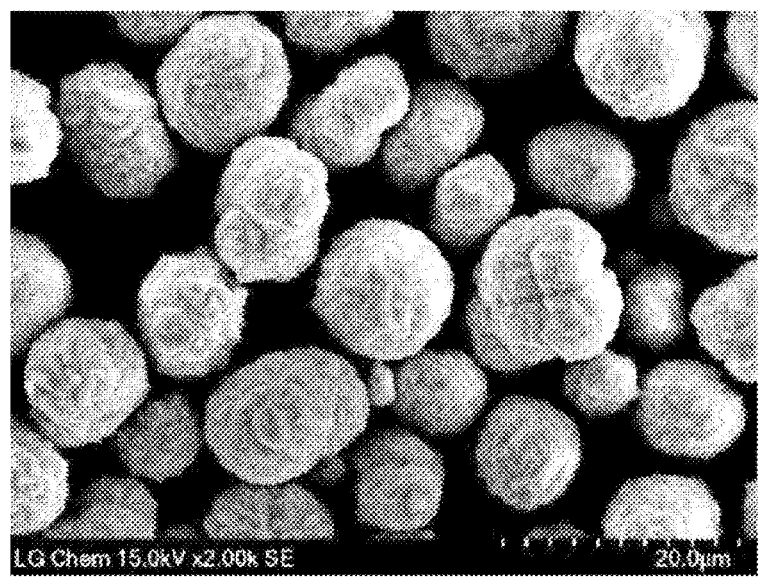

FIG. 8 is a scanning electron microscope (SEM) image of the positive electrode active material precursor of Example 1, FIG. 9 is an SEM image of the positive electrode active material precursor of Comparative Example 1, and FIG. 10 is an SEM image of the positive electrode active material precursor of Comparative Example 3. As illustrate in FIG. 8, with respect to the positive electrode active material precursor particles of Example 1 prepared by the continuous concentration process in which the solid content was constantly increased with the reaction time, the growth rate of the particles was also constantly maintained in addition to the increase in the solid content, and, accordingly, it may be confirmed that the positive electrode active material precursor particles had a spherical particle shape and had a relatively uniform particle size.

In contrast, with respect to the positive electrode active material precursor prepared by using the continuous reactor as in Comparative Example 1, it may be confirmed that particles having a large size and particles having a small size were mixed as shown in FIG. 9. With respect to the continuous stirring process of Comparative Example 1, since the addition and the discharge of the reaction raw materials occurred at the same time, the solid content in the reactor was not changed and there were deviations in the retention time and the reaction time of the reaction raw materials in the reactor, and thus, the size and particle size distribution of the precursor generated were not uniform.

With respect to the positive electrode active material precursor prepared in Comparative Example 3, it may be confirmed that size and shape of the positive electrode active material precursor particles were not uniform as shown in FIG. 10. With respect to the positive electrode active material precursor prepared in Comparative Example 3, the solid content was changed by concentrating the reaction-completed solution in the separate concentration tank and then recycling the solid content contained in the concentrated slurry to the reactor, and the growth rate of the particles was also not constant. It may be confirmed that the size and shape of the positive electrode active material precursor particles thus prepared were not uniform.

Experimental Example 6: Changes in Physical Properties with Changes in Solid Content in Reactor Changes in physical properties with changes in solid content of the nickel cobalt manganese composite metal hydroxide particles in the reactor during the continuous concentration process as in Example 1 were measured. Specifically, 50 mL of the solution in the reactor was extracted at intervals of 10 hours, filtered under reduced pressure, and dried at 120° C., and an amount of the recovered precursor was divided by the amount of the extracted solution (50 mL) to measure the changes in the solid content in the reactor. When the solid content in the reactor was 20%, 40%, 60%, 80%, 100%, and 120%, positive electrode active material precursor particles were respectively extracted to measure average particle diameter, specific surface area, and aspect ratio thereof, and the results thereof are presented in Table 3 below. In a case in which the solid content in the reactor was increased at a constant rate as illustrated in Table 3, the aspect ratio of the positive electrode active material precursor particles approached 1 and, accordingly, it may be confirmed that the specific surface area of the precursor was also decreased. Thus, the positive electrode active material precursor particles may be densely grown. In this regards, characteristics of the positive electrode active material precursor according to the solid content of the positive electrode active material precursor particles prepared in Example 1, which remained in the reactor, are presented in Table 3 below.

TABLE 3

| | Solid content in the reactor | | | | | |
|---|---|---|---|---|---|---|
| | 20% | 40% | 60% | 80% | 100% | 120% |
| Average particle diameter ($D_{50}$) (μm) | 8.6 | 10.0 | 11.3 | 12.4 | 13.3 | 14.0 |
| Specific surface area (m²/g) | 6.48 | 4.02 | 3.86 | 3.66 | 3.01 | 3.64 |
| Aspect ratio | 0.85 | 0.92 | 0.92 | 0.93 | 0.94 | 0.94 |

As illustrated in Table 3, with respect to the positive electrode active material precursor particles prepared in Example 1, since the positive electrode active material precursor particles grew as the solid content in the reactor was increased, it may be confirmed that the average particle diameter ($D_{50}$) was increased. Also, it may be confirmed that the aspect ratio of the positive electrode active material precursor particles approached 1 as the solid content was increased, and, since the positive electrode active material precursor particles became spherical as the aspect ratio approached 1, it may be confirmed that the specific surface area thereof was reduced.

Figure 11:
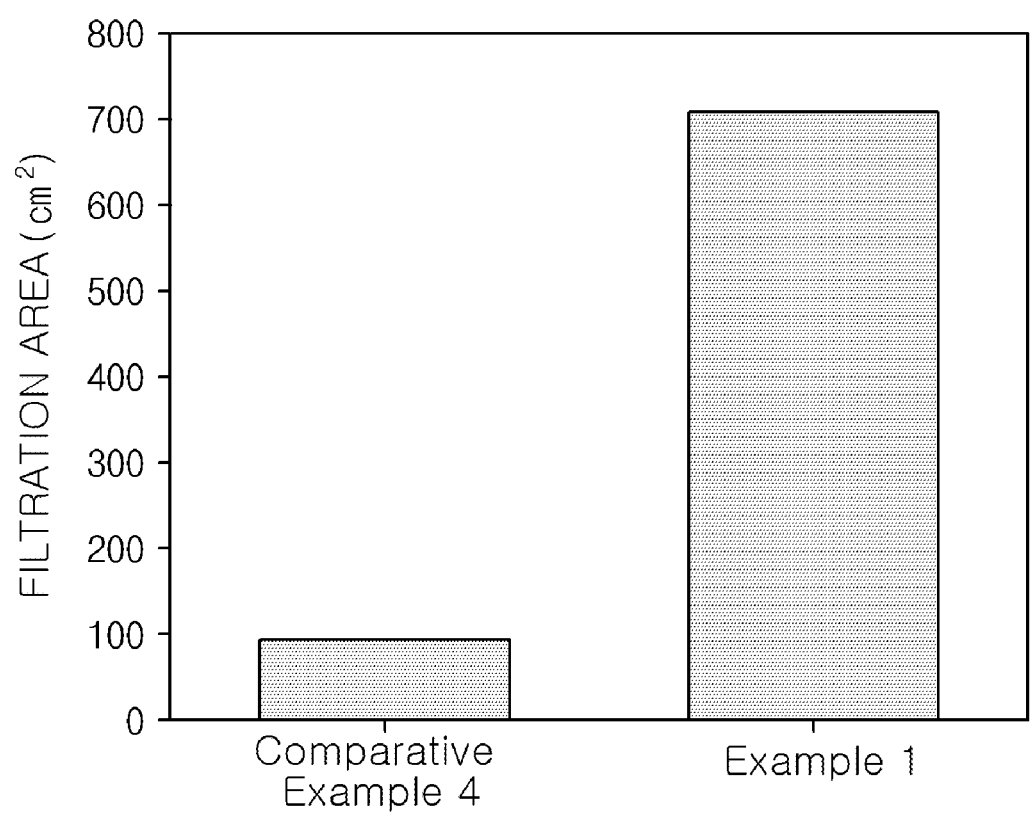
FIG. 11 illustrates filtration areas of filtration devices used in Example 1 and Comparative Example 4.

Experimental Example 7: Positive Electrode Active Material Precursor Yield Check In order to compare productivities of the positive electrode active material precursors prepared in Example 1 and Comparative Example 4, reaction was performed for the same time (80 hours). After the reaction was performed for 80 hours, amounts of the positive electrode active material precursors formed were measured, and the results thereof are presented in Table 4 below. In this case, the reactors for preparing the positive electrode active material precursors of Example 1 and Comparative Example 4 had all the same configuration, but the filtration areas of the filtration devices were different as shown in FIG. 11.

TABLE 4

| | Amount of precursor formed (kg) |
|---|---|
| Example 1 | 59 |
| Comparative Example 4 | 35 |

As illustrated in Table 4, the amount of the positive electrode active material precursor prepared in Example 1 was significantly larger than that of the positive electrode active material precursor prepared in Comparative Example 4. This is due to differences in the input flow of the reaction solution including the transition metal-containing solution, the NaOH aqueous solution, and the NH$_4$OH aqueous solution and the retention time of the reaction solution depending on the filtration area.

The invention claimed is:

1. A positive electrode active material precursor represented by Formula 1,
    wherein when the positive electrode active material precursor is rolled at 2.5 kgf/cm², a fine powder with an average particle diameter ($D_{50}$) of 1 μm or less is generated in an amount of less than 1%, and
    wherein the positive electrode active material precursor has an aspect ratio of 0.93 or more:

$$[Ni_xCo_yM^1_zM^2_w](OH)_2 \quad \text{[Formula 1]}$$

wherein, in Formula 1, 0.5≤x<1, 0<y≤0.5, 0<z≤0.5, and 0≤w≤0.1,
    M$^1$ comprises at least one selected from the group consisting of manganese (Mn) and aluminum (Al), and
    M$^2$ comprises at least one selected from the group consisting of zirconium (Zr), boron (B), tungsten (W), molybdenum (Mo), chromium (Cr), niobium (Nb), magnesium (Mg), hafnium (Hf), tantalum (Ta), lanthanum (La), titanium (Ti), strontium (Sr), barium (Ba), cerium (Ce), fluorine (F), phosphorus (P), sulfur (S), and yttrium (Y).

2. The positive electrode active material precursor of claim 1, wherein the positive electrode active material precursor has a ($D_{95}$−$D_5$)/$D_{50}$ of 0.7 or less.

3. The positive electrode active material precursor of claim 1, wherein the positive electrode active material precursor has a specific surface area (Brunauer-Emmett-Teller (BET)) of 5 m²/g or less.

4. The positive electrode active material precursor of claim 1, wherein the positive electrode active material precursor has a tap density of 2.0 g/cc or more.

5. The positive electrode active material precursor of claim 4, the tap density ranges from 2.1 g/cc to 2.3 g/cc.

6. The positive electrode active material precursor of claim 1, wherein the aspect ratio is 0.93 to 1.0.

* * * * *